Feb. 27, 1934.  D. B. MASON  1,948,625
PRECIPITATION AND TREATMENT OF CELLULOSE DERIVATIVES
Filed Oct. 4, 1929
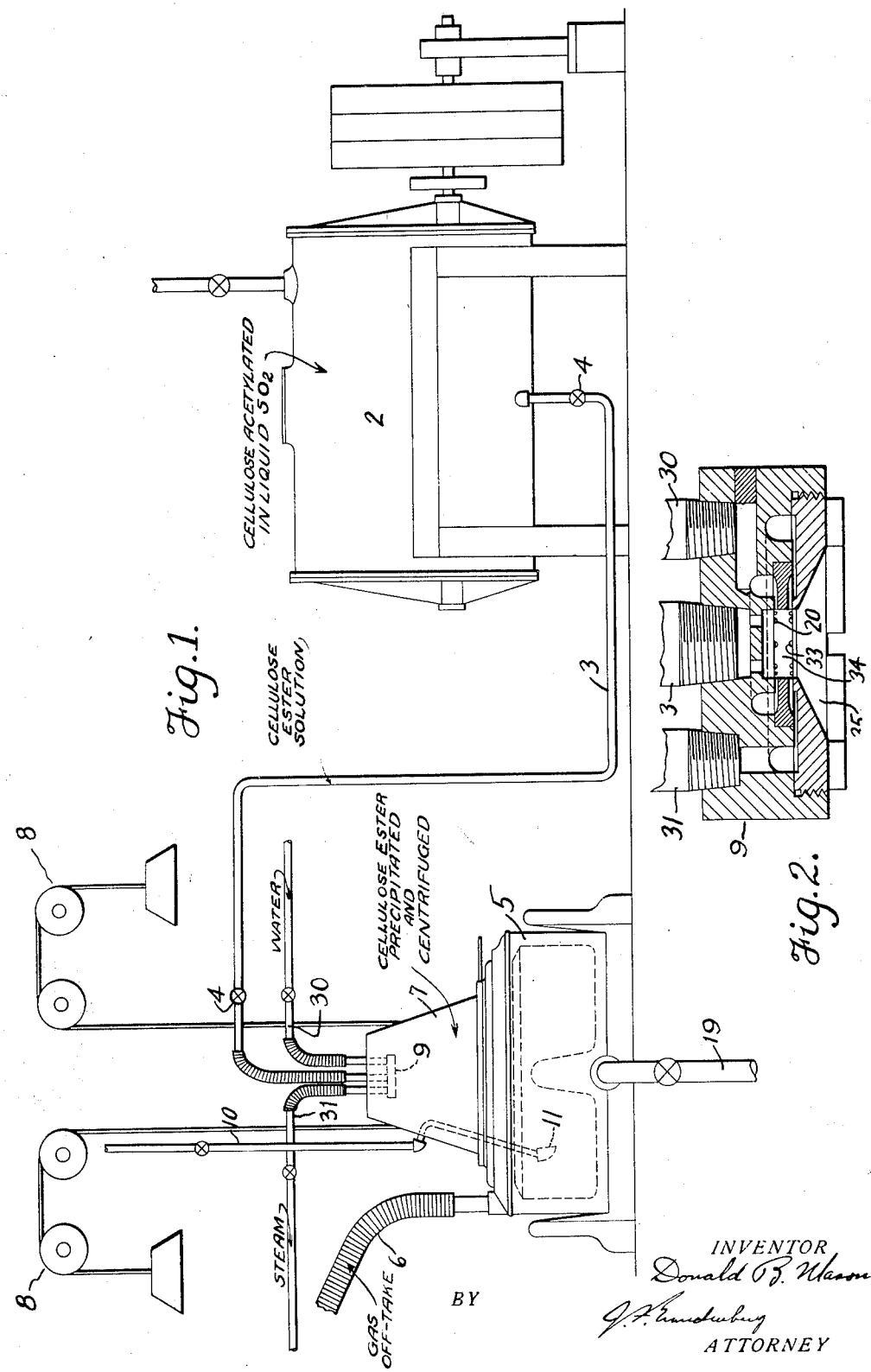

Patented Feb. 27, 1934

1,948,625

UNITED STATES PATENT OFFICE 1,948,625

PRECIPITATION AND TREATMENT OF CELLULOSE DERIVATIVES

Donald B. Mason, Catonsville, Md., assignor to U. S. Industrial Alcohol Co., New York, N. Y., a corporation of West Virginia Application October 4, 1929. Serial No. 397,211

12 Claims. (Cl. 260—102)

The invention relates to a method and apparatus for precipitating and dehydrating, or precipitating, treating and dehydrating, cellulose derivatives, and more especially cellulose acetate and other cellulose esters of organic acids, to recover them from their colloidal solutions or reaction mixtures. The invention is more particularly concerned with the handling of such solutions which contain an expanding medium, more especially liquid sulfur dioxid, which is utilized to disrupt the material at the moment of passing from the state of a sol to the stage of gel formation known as precipitation, in order to obtain the product in a very loose, light and finely divided condition.

In my copending application Serial No. 362,105, filed May 10, 1929, I have disclosed an improved method and apparatus for precipitating such solutions or reaction mixtures, by commingling issuing jets or streams of the ester solution and of a precipitating or coagulating liquid, accompanied by jets of hot vapor, this being accomplished by means of a nozzle arrangement causing the streams to combine in a forceful manner. Thereby the cellulose acetate is coagulated or precipitated at the moment of abrupt release of the sulfur dioxid in the gaseous form, the operation being such as to secure thorough disruption of the precipitating ester masses, with the use of a minimum amount of water or other precipitant. Precipitation effected in this manner is easy to control, and the cellulose ester is precipitated uniformly in a loose or fibrous condition which is especially favorable for washing, drying, for putting into eventual solutions and for all treatments to which it may be desirable to subject it.

When precipitation is practised in a simple precipitating chamber, with provisions for the gas to pass off and the liquid to drain away, the precipitated material remains saturated with liquid containing considerable amounts of acid and sulfur dioxid. Removal of these substances from the ester product is difficult and time-consuming. If steam is used to distil off the sulfur dioxid from the mass, the cellulose ester may be injured. Yet the sulfur dioxid should be removed before the mass is taken from the precipitating chamber. If the sulfur dioxid is washed out, the acid values are very much diluted.

Even though the sulfur dioxid be removed by steaming, the acid which remains makes the transfer of the cellulose ester from the precipitation chamber to the centrifuge a laborious and disagreeable operation.

The object of the present invention is to avoid these and other obstacles to smooth and efficient operation, to reduce handling, and to secure substantial economies and important facilities for the treatment of the precipitated ester. This is accomplished by precipitating the cellulose derivative and delivering it directly into a gas-tight centrifuge, and preferably by precipitating it into a centrifuge which is in rotation while the cellulose product is being collected in it. The sulfur dioxid gas is conducted off from the centrifuge for recovery, and liquid saturating the precipitating material and containing the acid, dissolved sulfur dioxid and other values which may be present, is removed by the action of the centrifuge and also conducted away. After the cellulose ester has been freed of as much liquid as can be conveniently expelled in this manner, the material is washed in the centrifuge, where it may also be treated in such other manner as may be desired, and when sufficiently washed and treated it is again dehydrated by the centrifugal effect and removed.

In a concrete aspect, the invention comprises the combination of a gas-tight centrifuge with a precipitating nozzle plan such as disclosed in my application Serial No. 362,105, the nozzle, or nozzles, being connected with a pressure vessel containing the cellulose ester solution. One of the objects of this invention is to provide such a combination with means for withdrawing, together or separately, the gas and liquids evolved during precipitation. Another object is to provide such a combination with means for washing out or otherwise removing liquid and gas which are not desired in the cellulose ester, and with means for further treatment of the cellulose ester cake if desired, such means being operable while the centrifuge is still gas-tight.

In a preferred embodiment of the invention the centrifuge is provided with a tight, removable cover, beneath which the precipitating arrangements are disposed, and provision is made so that this cover can be raised to permit the removal of the cake.

An advantage of the invention is that it enables the most perfect balancing of the charge in the centrifuge to be attained, thereby avoiding uneven running and also making the washing more efficient.

Liquid sulfur dioxid is the most effective expanding solvent medium for the purpose of the invention, but it is possible that other liquefied gases might be used. Instead of liquefied gas, a substance liquid at ordinary temperatures but sufficiently volatile to pass abruptly into vapor under the conditions of temperature and pressure obtaining at the region of precipitation could be used. Thus, a solution of cellulose acetate in or with ether could be precipitated and centrifuged in accordance with my invention, sufficient heat being supplied to vaporize the ether suddenly. Finally, colloidal solutions charged with a compressed inert gas, such as carbon dioxid or air, might be precipitated and treated as contemplated herein, though the desired disruption of the precipitating ester is best realized when the disrupting agent is a solvent for the material.

A solvent expanding medium need not constitute the entirety or even the bulk of the solvent in which the cellulose derivative is dispersed prior to precipitation, provided that it is present in sufficient quantity to produce a definite disruptive effect. The expanding medium can be added to a solution or reaction mixture already produced; for example, cellulose acetate may be made in the usual way in a medium of acetic acid, and a sufficient quantity of liquid sulfur dioxide can be introduced into the reaction mixture held in a pressure vessel, before discharging and precipitating it in a centrifuge as described.

Advantages of the present invention are that it does away with a separate precipitation chamber, reduces handling of the product, enables all operations from raw materials to damp finished product to be carried out in a closed system, eliminates irritating gas and vapor nuisance, permits balanced loading of the centrifuge, and combines separation of gas or vapor, liquid and solid in one operation.

The accompanying drawing illustrates a form of execution of the invention:

Fig. 1 is a somewhat schematic side elevation of apparatus; and

Fig. 2 is a section of the preferred form of the precipitating nozzle, as shown in my copending application Serial No. 362,105.

A closed pressure vessel 2 holds the cellulose ester solution, the term "solution" being used in a general sense. In this solution the cellulose acetate or other cellulose ester is colloidally dispersed in a medium composed partly or entirely of liquid sulfur dioxide. As explained in my prior application, the solution may have been, and preferably has been, brought toward the precipitating point by incorporating in the solution an amount of a coagulating agent, such as water, which is slightly less than that required to bring about definite precipitation, the solution being still freely flowable through pipes under the $SO_2$ pressure, its labile condition enabling precipitation to be effected at the precipitating point by a limited additional amount of water or other suitable coagulant. However, the invention is not limited to this feature.

The invention is applicable to the precipitation and treatment of cellulose acetate or other cellulose derivatives from liquid sulfur dioxid solutions, irrespective of the particular process by which the cellulose derivative was produced. It is also applicable to the treatment of already manufactured cellulose esters of organic acids by dissolving them under pressure in a simple or mixed solvent comprising liquid sulfur dioxid, and then precipitating and treating them in the manner herein described, for the purpose of improving them in point of physical condition or otherwise.

The invention has special utility as part of manufacturing operations by which the cellulose ester is formed and/or hydrated and then precipitated and/or treated in a connected system.

The vessel 2 may, therefore, be understood as representing a tight reaction chamber in which cellulose is acylated in a medium comprising liquid sulfur dioxid, or in which the resulting reaction mixture is subjected to an after-hydration treatment. These operations may be carried out in the same vessel, or the reaction mixture resulting from the acylation stage may be transferred from the acylation vessel through a valved pipe to a hydration vessel. This is explained in my prior application and need not be illustrated here.

It will be sufficient to state that cellulose, or a cellulose derivative, may be acylated by a suitable acylating agent, or agents, such as, for example, acetic anhydride, in liquid sulfur dioxid as a reaction medium, preferably in the presence of sulfuric acid or some other catalyst, and that, if the primary cellulose ester thus formed is not the desired product, it may then be hydrated, that is to say, modified until it exhibits a desired degree of solubility in acetone, ethyl acetate, or other solvent, by digesting the reaction mixture with a proper amount of water or other so-called hydrating agent.

Thus, for example, the solution in the vessel 2, if precipitation follows an after-hydration treatment, may be a reaction mixture containing approximately 1000 parts of liquid sulfur dioxid, 230 parts of acetic acid, 200 parts of water, 13 parts of sodium sulfate and 150 parts of cellulose acetate. This is given merely by way of illustration.

A discharge pipe 3 extends from the vessel 2, this pipe having valves 4 which hold the solution in the vessel until it is ready to be discharged. This pipe leads to a centrifuge 5, which is virtually gas-tight except for the intended offtake of $SO_2$ gas through a gas outlet conduit 6 to a suitable recovery system (not shown).

I provide this centrifuge with a closure cover 7, preferably in the form of a truncated cone. This cover is secured to the stationary body of the centrifuge in a gas-tight manner by suitable fastening means, permitting its ready removal for opening the centrifuge when the cake is to be taken out. Counterweighted means indicated at 8 may be provided for raising and supporting this cover, and it will be understood that the various conduits shown entering the cover may be flexible or disconnectible.

The line 3 passes through the cover and terminates in a precipitation nozzle or head 9 located centrally beneath the cover, where it is held by its pipe connections being secured to the cover or by other suitable means.

This nozzle is preferably of the form disclosed in my application Serial No. 362,105 and shown for purpose of illustration in Fig. 2 of the accompanying drawing. It has, in addition to the line 3, two other valved pipe connections marked 30 and 31, connected, respectively, with sources of supply of water for precipitation and steam (or other gas or vapor) to serve as a heating agent. The precipitating liquid may itself be sufficiently heated to overcome the chilling effect due to vaporization of the $SO_2$, and to promote the abrupt gasification of this medium. Again, heat might be supplied to the solution indirectly, by heating the precipitation head. The vapor supply and the line 31 might, therefore, be omitted. On the other hand, if sufficiently wet steam, or a mixture of steam and water were used, the line 30 might be omitted.

The most effective result is accomplished when the stream of the cellulose ester, at the point where it is delivered or where it is substantially released from pressure, is intermingled at approximately the same region, and preferably in succession, with jets of the coagulating liquid and of the hot vapor. Fig. 2 shows water jet orifices 20, and immediately below them steam jet orifices 33, opening inward into an outlet chamber 34 through which the stream of cellulose ester solution is discharged from the pipe 3. The cellulose ester precipitated and disrupted in this manner is thrown downward and outward from a flaring mouth 35 and falls into the rapidly rotating basket of the centrifuge with the result that the load is automatically and evenly distributed.

The construction and arrangement of the precipitation nozzle part of the apparatus may be widely varied; for example, it is not necessary that the streams be brought together by means of a common head. It is sufficient that the solution to be precipitated and the precipitating agent be mingled with each other, and preferably also with a heating medium, under such conditions that the precipitating ester is abruptly and evenly disrupted, precipitation and disruption taking place continuously and simultaneously with the delivery of the solution to a region of reduced or relatively low pressure.

The centrifuge is provided with a liquid outlet 19, and with a valved pipe connection 10 for introducing wash water through a spray nozzle 11, this same, or another, means being adapted to serve for introduction of other desired treating agents.

In operation, the centrifuge is started, and when it has attained the proper speed, the valved lines 3, 30 and 31 are opened to permit the mixture from vessel 2 to mix at the head 9 with water and steam, whereby the cellulose ester is precipitated and drops into the whirling basket of the centrifuge. The sulfur dioxide liberated as gas in the closed centrifuge passes out to the recovery system through the pipe 6, while liquid extracted from the cellulose ester by the centrifugal action, such as water and acetic acid, together with some sulfur dioxide in solution and any other substances which may be in solution, is drawn off through the pipe 19.

When the pressure vessel 2 is empty, or the centrifuge basket is full, valved pipes 3, 30 and 31 are turned off, and valved pipe 10 is turned on and water from this source washes the cellulose ester cake until the cake contains practically no sulfur dioxide, acetic acid, or other values or substances which it is not desired to retain in the cellulose product. These wash liquors pass from the centrifuge through the pipe 19 and are collected separately from the liquid which was previously expelled from the cellulose ester.

The cellulose ester while still in the centrifuge can be given any further chemical treatment which may be necessary or desirable, such as, for example, a wash with dilute sodium bicarbonate solution, followed by additional washing if desired.

When the charge is sufficiently dehydrated, the cone top 7 of the centrifuge is raised and the cellulose acetate cake is removed. The cover is replaced and fastened, and the centrifuge is then ready for the precipitation and treatment of another batch of cellulose ester solution.

A gradual discharge of the ester solution with concurrent precipitation of the ester and its collection in the basket of the centrifuge while the basket is rotated at full speed not only trims the load but also compacts each successive portion of the bulky precipitate. This enables the centrifuge to handle a large charge.

The invention is not confined to the manufacture and treatment of cellulose acetate, since other organic acid esters of cellulose, such as cellulose propionate, cellulose benzoate, etc., as well as other cellulose derivatives, such as cellulose ethers, may be handled in a similar way.

I claim:

1. The method which comprises forcibly commingling streams of a colloidal solution of a cellulose derivative and of a precipitant collecting the precipitated cellulose, and dehydrating the precipitated material by centrifugal action where it is collected.

2. The method which comprises forcibly commingling streams of a colloidal solution of a cellulose derivative and of a precipitant, thereby precipitating the cellulose derivative, and collecting the precipitated material in the basket of a centrifuge, while rotating said basket.

3. The method which comprises forcibly commingling streams of a colloidal solution of an organic acid ester of cellulose and of a precipitant, and collecting the cellulose ester in the basket of a centrifuge, while rotating said basket.

4. The method which comprises mixing forcibly streams of a cellulose ester solution and of a precipitant, and precipitating the cellulose ester within a centrifuge.

5. The method which comprises precipitating a liquid sulfur dioxid solution of cellulose ester by commingling streams of the solution and of a precipitant under conditions such that sulfur dioxid gas is abruptly released, collecting the loose precipitated cellulose ester directly in a centrifuge, and treating it therein.

6. The method which comprises delivering under pressure a liquid sulfur dioxid solution of cellulose ester and at a region where the pressure is released commingling the same with a stream of a precipitant while supplying heat, so that the precipitating ester is disrupted, and centrifuging the precipitated ester as it is collected.

7. The method which comprises delivering a stream of cellulose ester solution, precipitating the cellulose ester by forcibly commingling streams of the solution and of a precipitant, and centrifuging and washing the cellulose ester where it falls.

8. The method which comprises discharging under pressure a stream of a solution of a cellulose ester containing liquid sulfur dioxid into an enclosure where the pressure is released, commingling said stream with a stream of precipitant so as to precipitate the cellulose ester, centrifuging the precipitated ester in the enclosure, and conducting away the gas and liquid.

9. The method which comprises producing under pressure a solution of cellulose acetate with liquid sulfur dioxid, delivering and commingling streams of said solution and of a precipitant so as to precipitate and disrupt the cellulose acetate, precipitating the cellulose acetate in a centrifuge, and there treating it.

10. In the manufacture of cellulose esters of organic acids employing liquid sulfur dioxide as a reaction medium, the improvement which comprises delivering and commingling streams of the reaction mixture and of a precipitant under conditions such that the cellulose ester is precipitated and disrupted, and collecting and treating the precipitated cellulose ester in a centrifuge.

11. The method which comprises producing a cellulose acetate reaction mixture containing liquid sulfur dioxid, precipitating the same by delivering and commingling streams of the reaction mixture and of a preciptant, and centrifuging the cellulose acetate as it is collected.

12. The method which comprises precipitating a cellulose ester from a solution containing liquid sulfur dioxid, by delivering and commingling streams of the solution and of a precipitant and abruptly releasing sulfur dioxid from the precipitating ester, with the aid of supplied heat, collecting the precipitated cellulose ester directly in a gas-tight centrifuge, centrifuging the cellulose ester, conducting off the gas and liquid which are separated from the esters, and introducing washing liquid to the cake thus formed without opening the centrifuge.

DONALD B. MASON.